United States Patent
Lou et al.

(10) Patent No.: US 9,122,260 B2
(45) Date of Patent: Sep. 1, 2015

(54) INTEGRATED CONTROLS DESIGN OPTIMIZATION

(75) Inventors: Xinsheng Lou, West Hartford, CT (US); Carl H. Neuschaefer, Enfield, CT (US)

(73) Assignee: ALSTOM Technology Ltd, Baden (CH)

( * ) Notice: Subject to any disclaimer, the term of this patent is extended or adjusted under 35 U.S.C. 154(b) by 724 days.

(21) Appl. No.: 12/394,654

(22) Filed: Feb. 27, 2009

(65) Prior Publication Data

US 2009/0222108 A1 Sep. 3, 2009

Related U.S. Application Data

(60) Provisional application No. 61/033,185, filed on Mar. 3, 2008, provisional application No. 61/033,202, filed on Mar. 3, 2008, provisional application No. 61/033,210, filed on Mar. 3, 2008.

(51) Int. Cl.
*G06F 1/28* (2006.01)
*G05B 13/04* (2006.01)

(52) U.S. Cl.
CPC ...................................... *G05B 13/04* (2013.01)

(58) Field of Classification Search
CPC ...................... G05B 13/04; F23C 2900/99008; F23C 10/04
USPC .............. 700/266; 435/3, 286.1, 812; 436/55; 702/22–25, 30, 31, 32, 109; 422/62, 422/105
See application file for complete search history.

(56) References Cited

U.S. PATENT DOCUMENTS

| | | | |
|---|---|---|---|
| 5,414,619 A | | 5/1995 | Katayama et al. |
| 5,447,024 A | * | 9/1995 | Ishida et al. ..................... 60/775 |

(Continued)

FOREIGN PATENT DOCUMENTS

| | | |
|---|---|---|
| GB | 2350695 | 12/2000 |
| GB | 2440674 | 2/2008 |

(Continued)

OTHER PUBLICATIONS

Tiejun Zhang et al: "Terminal Cost Constraint based Stable Fuzzy Model Predictive Control of a Nonlinear Fluidized Bed Combustion Plant" Intelligent Control, 2007. ISIC 2007. IEEE $22^{nd}$ International Symposium on, IEEE, PI, Oct. 1, 2007, pp. 401-406, XP301230209, ISBN: 978-1-4244-0440-7 abstract p. 401.

(Continued)

*Primary Examiner* — Shogo Sasaki
(74) *Attorney, Agent, or Firm* — Robert D. Crawford

(57) ABSTRACT

A control system (207) for optimizing a chemical looping process of a power plant includes an optimizer (420), an income algorithm (230) and a cost algorithm (225) and a chemical looping process models. The process models are used to predict the process outputs from process input variables. Some of the process in puts and output variables are related to the income of the plant; and some others are related to the cost of the plant operations. The income algorithm (230) provides an income input to the optimizer (420) based on a plurality of input parameters (215) of the power plant. The cost algorithm (225) provides a cost input to the optimizer (420) based on a plurality of output parameters (220) of the power plant. The optimizer (420) determines an optimized operating parameter solution based on at least one of the income input and the cost input, and supplies the optimized operating parameter solution to the power plant.

7 Claims, 5 Drawing Sheets

(56) References Cited

U.S. PATENT DOCUMENTS

| | | | |
|---|---|---|---|
| 5,762,008 | A | 6/1998 | Martin et al. |
| 5,806,052 | A | 9/1998 | Bonissone et al. |
| 6,222,164 | B1 | 4/2001 | Stoddard et al. |
| 7,083,658 | B2 | 8/2006 | Andrus, Jr. et al. |
| 7,533,620 | B2 | 5/2009 | Morin et al. |
| 7,824,574 | B2 * | 11/2010 | White et al. .................. 252/373 |
| 2004/0237404 | A1 * | 12/2004 | Andrus et al. .................. 48/101 |
| 2005/0075993 | A1 | 4/2005 | Jang et al. |
| 2005/0175533 | A1 * | 8/2005 | Thomas et al. ............... 423/657 |
| 2006/0100721 | A1 | 5/2006 | Piche |
| 2006/0130719 | A1 * | 6/2006 | Morin et al. .................. 110/348 |
| 2007/0049489 | A1 * | 3/2007 | Becue et al. .................. 502/304 |
| 2007/0250215 | A1 | 10/2007 | Jia et al. |
| 2008/0164443 | A1 * | 7/2008 | White et al. .................. 252/373 |

FOREIGN PATENT DOCUMENTS

| | | |
|---|---|---|
| JP | H08-339204 | 12/1996 |
| JP | H09-242507 | 9/1997 |
| JP | 2003-323201 | 11/2003 |
| JP | 2005-176495 | 6/2005 |
| JP | 2006-178626 | 7/2006 |
| JP | 2007-272361 | 10/2007 |

OTHER PUBLICATIONS

Susan M. Maley and Robert R. Romanosky; "Stakeholder Workshop. Advanced Process Control for Next Generation Power Plants. Summary Report" Internet Citation, [Online] Jul. 1, 2007, p. 78pp, XP009121863.

Xinsheng Lou et al.: "Simulation and Advanced Controls for Hybrid Combustion-Gasification Chemical Looping Process" $18^{th}$ Annual Joint ISA POWID/EPRI Controls and $51^{st}$ ISA POWID Symposia 2008; Jun. 8-13, 2008, Scottsdale, Arizona, USA,, vol. 475, Jun. 8, 2008, pp. 326-337, XP009118467, ISBN: 978-1-60560-410-7.

PCT International Search Report and the Written Opinion of the International Searcing Authority dated Feb. 5, 2010—(PCT/US2009/035664).

U.S. Appl. No. 12/394,200, filed Feb. 27, 2009.

U.S. Appl. No. 12/384,509, filed Apr. 3, 2009.

PCT International Search Report and the Written Opinion of the International Searching Authority dated Mar. 8, 2009—(PCT/US2009/035674).

PCT International Search Report and the Written Opinion of the International Searching Authority dated Aug. 7, 2009—(PCT/US2009/035672).

S. Maley, R. Romanosky; "Plant Process Control Workshop" U.S. Department of Energy, National Energy Technology Laboratory, Mar. 22, 2006 XP-002532105; p. 18-25, p. 51-52.

A.G. Abilov, Z. Zeybek, O. Tuzunalp, Z. Telatar: "Fuzzy Temerature Contol of Industrial Refineries Furnaces Through Combined Feedforward/Feedback Multivariable Cascade Systems" Chemical Engineering and Processing 41, Jan. 5, 2001, XP002532106 the whole document.

\* cited by examiner

INTEGRATED CONTROLS DESIGN OPTIMIZATION

CROSS-REFERENCE TO RELATED APPLICATIONS

The present invention claims the benefit of U.S. Provisional Patent Application Ser. No. 61/033,202, entitled "CONTROL AND OPTIMIZATION SYSTEM", U.S. Provisional Patent Application 61/033,210, entitled "FUZZY LOGIC CONTROL AND OPTIMIZATION SYSTEM", and U.S. Provisional Patent Application Ser. No. 61/033,185, entitled "INTEGRATED CONTROLS DESIGN OPTIMIZATION", all of which are incorporated herein by reference in their entirety.

STATEMENT REGARDING FEDERALLY SPONSORED RESEARCH OR DEVELOPMENT

The U.S. Government has rights in this invention pursuant to Contract No. DE-FC26-07NT43095 awarded by the U.S. Department of Energy.

TECHNICAL FIELD

The present disclosure relates generally to an optimization system and, more particularly, to a process design and control optimization system for a chemical looping plant.

BACKGROUND

Chemical looping (CL) is a recently developed process which can be utilized in electrical power generation plants which burn fuels such as coal, biomass, and other opportunity fuels. The CL process can be implemented in power plants, and provides promising improvements in terms of reduced plant size, reduced emissions, and increased plant operational efficiency, among other benefits.

A typical CL system utilizes a high temperature process, whereby solids such as calcium- or metal-based compounds, for example, are "looped" between a first reactor, called an oxidizer, and a second reactor, called a reducer. In the oxidizer, oxygen from air injected into the oxidizer is captured by the solids in an oxidation reaction. The captured oxygen is then carried by the oxidized solids to the reducer to be used for combustion and/or gasification of a fuel such as coal, for example. After a reduction reaction in the reducer, the solids, no longer having the captured oxygen, are returned to the oxidizer to be oxidized again, and the cycle repeats.

Depending on a ratio of the fuel to the air, different gases are produced in the oxidation and reduction reactions. As a result, the ratio of fuel to air can be controlled such that the CL system may be utilized in different ways, such as: as a hybrid combustion-gasification process which produces hydrogen for gas turbines, fuel cells and/or other hydrogen-based applications; as a hybrid combustion-gasification process which produces a synthesis gas (syngas) containing varying amounts of hydrogen and carbon dioxide for gas turbines and/or fuel cells; or as a combustion process for a combustion-based steam power plant.

The CL process is more complicated than processes of traditional plants such as conventional circulating fluidized bed (CFB) plants, for example. As a result, traditional plant controls applied to the CL process necessarily result in separate control loops for each CL loop. However, using separate control loops for each CL loop is inefficient and does not optimize performance of the CL process, since accurate control depends on coordinated control of multiple parameters in each loop, and parameters which crossover between loops.

In addition, the CL process has multi-phase flows and chemical reactions which are characterized by process non-linearities and time delays due to mass transport and chemical reaction rates. As a result, traditional power plant design without considering control optimization systems in early stages of process design are further inadequate for integrated optimization of process performance and system operability.

Further, many of the variables in the CL process are non-linear and/or have complex relationships with other variables, e.g., inter-loop interaction of variables. As a result, models which effectively simulate these multi-interdependent variable relationships have thus far been inaccurate, inefficient, and difficult and/or time consuming to work with.

Optimization systems which have been developed thus far are focused on optimizing conventional combustion power plants. Furthermore, these optimization systems have been focused on solving very specific, localized optimization problems rather than global optimization of plant operations. Furthermore, the associated statistical analysis for conventional combustion power plants is based upon an assumption of linear relationships between variables. As a result, the associated statistical analysis for conventional combustion power plants is cumbersome and inaccurate when used to analyze the complex, inter-related, nonlinear dynamics of variables in the CL process.

In the next generation power plants based on a CL system, steam-water side control requirements will remain essentially the same as in current conventional plants (e.g., feedwater and steam flows, steam pressures, steam temperatures, drum levels). However, it is expected that improved controls which utilize both steam-water side variables and combustion/gasification CL variables will be required to better handle inherent process variable interactions in the CL process. In addition, conventional power plant simulators are limited to steam/water side process dynamics and only very simple combustion or furnace process dynamics are modeled; dynamic models of complex atmosphere control systems such as in the CL process are not available at this time.

Process and equipment integration and optimization of the CL system is also needed. More specifically, CL integrated processes are currently not controlled at economically optimum operating conditions. This is especially true during load changes and when other plant disturbances occur. Complex relationships between the many variables and processes described above affect performance of the CL process, and further complicate efforts to optimally and efficiently control the CL process.

Accordingly, it is desired to develop an integrated process design and control optimization system and, more specifically, an integrated process design and control optimization system for a CL power plant, which overcomes the shortfalls described above.

SUMMARY

According to the aspects illustrated herein, there is provided a control system for optimizing a chemical looping process of a power plant includes an optimizer, an income algorithm and a cost algorithm. The income algorithm provides an income input to the optimizer based on a plurality of input parameters of the power plant. The cost algorithm provides a cost input to the optimizer based on a plurality of output parameters of the power plant. The optimizer determines an optimized operating parameter solution based on at least one of the income input and the cost input, and supplies the optimized operating parameter solution to the power plant.

According to the other aspects illustrated herein, a system for optimizing a power plant includes a chemical loop having an input for receiving an input parameter and an output for outputting an output parameter. The system further includes a nonlinear controller which receives the output parameter, optimizes the input parameter based on the received output parameter, and outputs the optimized input parameter to the input of the chemical loop.

According to yet other aspects illustrated herein, a system for optimizing a power plant includes a chemical loop having an input for receiving an input parameter, an output for outputting an output parameter, and a nonlinear model predictive controls controller operably connected to the chemical loop. The nonlinear model predictive controls controller includes a model part, a simulator part operably connected to the model part, and an optimizer part operably connected to the model part. The nonlinear model predictive controls controller receives the output parameter, optimizes the input parameter based on the received output parameter, and outputs the optimized input parameter to the input of the chemical loop.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
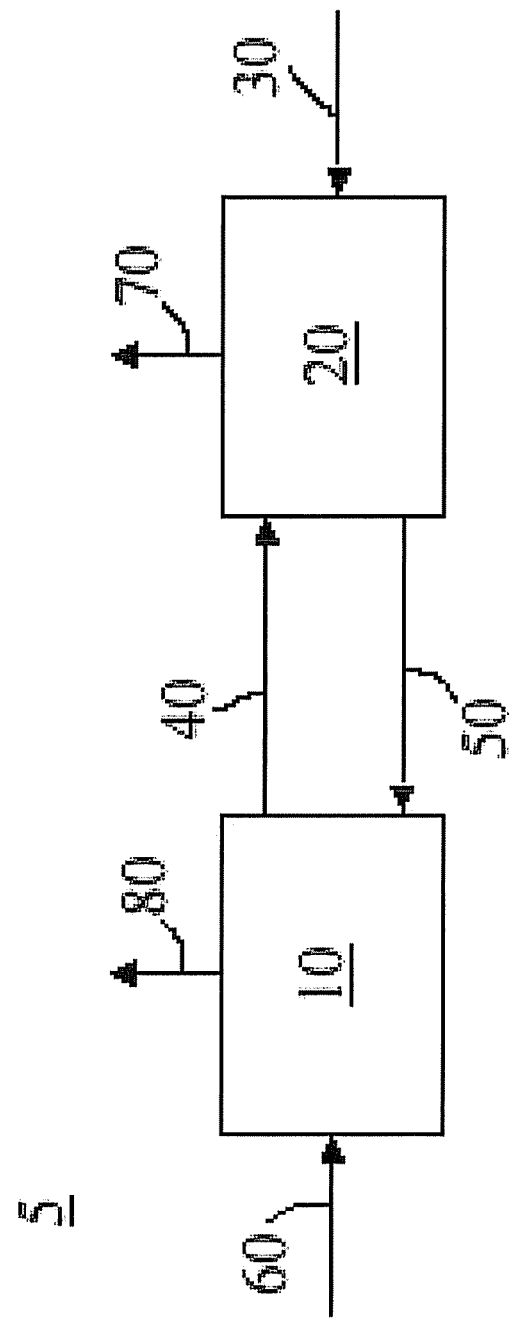
FIG. 1 is a block diagram of a calcium oxide-based two loop chemical looping (CL) system. The dual loop process designs is applicable to calcium based chemical looping as well.

Disclosed herein is an integrated process design and control optimization system for a chemical looping (CL) system of a CL plant, similar to that described in greater detail in U.S. Pat. No. 7,083,658, which is incorporated herein by reference. Referring to FIG. 1, a CL system 5 includes a first loop 10, e.g., a reducer 10, and a second loop 20, e.g., an oxidizer 20. Air 30 is supplied to the oxidizer 20, and calcium (Ca) 40 is oxidized therein to produce a calcium oxide (CaO) 50. In the CL process of the CL system 5, the CaO 50 is supplied to the reducer 10, and acts as a carrier to deliver oxygen to fuel 60 (such as coal 60, for example) supplied to the reducer 10. As a result, the oxygen delivered to the reducer 10 interacts with the coal 60 in the reducer 10. Reduced calcium oxide 40 is then returned to the oxidizer 20 to again be oxidized into CaO 50, and the CL process repeats.

Nitrogen gas ($N_2$) 70, extracted from the air 30 during oxidation, as well as heat (not shown) resulting from the oxidation, exit the oxidizer 20. Likewise, a gas 80 produced during reduction in the reducer 10 exits the reducer 10. The gas 80 includes, for example, a synthesis gas (syngas), hydrogen gas ($H_2$), and/or carbon dioxide gas ($CO_2$). Composition of the gas 80, e.g., proportions of the syngas, the $H_2$, and/or the $CO_2$ therein, varies based upon a ratio of the coal 60 to the air 30.

Exemplary embodiments are not limited to two loops, as described above with reference to FIG. 1, but instead may include either a single loop or more than two loops. For example, in an alternative exemplary embodiment, the CL system 5 includes a third loop (not shown), such as a calciner loop, for example, which allows $H_2$ generation from reformed syngas 80.

The calcium-based CL system 5 may also include a thermal loop which generates steam to drive a turbine, for example. Specifically, referring to FIG. 2, a thermal loop 90 includes a steam turbine 95 which drives a power generator 100 using steam 105 generated by boiling feedwater 110 with heat produced during oxidation in the oxidizer 20.

The air 30 is supplied to the oxidizer 20, as described above with reference to FIG. 1, while waste 115, such as ash and/or excess calcium sulfate ($CaSO_4$), are removed from the oxidizer 20 for disposal in an external facility (not shown). The coal 60, as well as calcium carbonate ($CaCO_3$) 120 and recirculated steam 125, are supplied to the reducer 10 for a reduction reaction therein.

Figure 2:
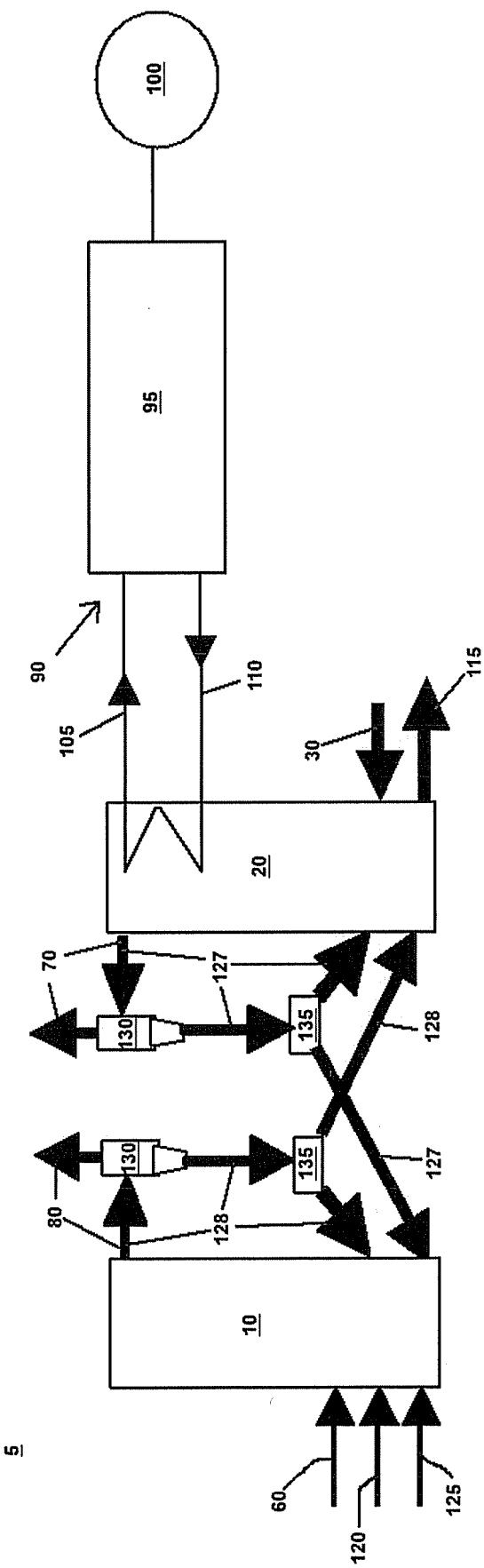
FIG. 2 is a block diagram of a CL combustion-based steam power plant.

In operation, the reduction reaction occurs between carbon and sulfur in the coal 60, the $CaCO_3$ 120, and $CaSO_4$ 127. The reduction reaction produces calcium sulfide (CaS) 128, which is separated by a separator 130 and is thereafter supplied to the oxidizer 20 through a seal pot control valve (SPCV) 135. A portion of the CaS 128, based upon CL plant load, for example, is recirculated to the reducer 10 by the SPCV 135, as shown in FIG. 2. In addition, the separator separates the gas 80, e.g., $CO_2$, from the CaS 128.

The CaS 128 is oxidized in an oxidation reaction in the oxidizer 20, thereby producing the $CaSO_4$ 127 which is separated from the $N_2$ 70 by a separator 130 and is supplied back to the reducer 10 via a SPCV 135. A portion of the $CaSO_4$ 127 is recirculated back to the oxidizer 20 by the SPCV 135 based upon CL plant load, for example. The oxidation reaction also produces heat which boils the feedwater 110 into the steam 105 supplied to the steam turbine 95.

While a calcium oxide based CL system has been described, the present invention is also applicable to a metal oxide based CL system similar to that described in U.S. patent application Ser. No. 10/542,749, which is incorporated herein by reference.

An exemplary embodiment of an integrated process design and control optimization system for a CL plant will now be described in further detail with reference to FIGS. 3 through 5. It will be noted that the integrated process design and control optimization system is not limited to the CL plant configurations described herein. For example, in alternative exemplary embodiments, the integrated process design and control optimization system may be used with any and all CL-based systems, including but not limited to: single, dual, and multiple, e.g., two or more, loop CL systems, whether calcium- or metal oxide-based; with or without steam activation loops; with/without calcinations loop; CL-based next generation CL-based plant with $CO_2$ capture for utilization or sequestration; and CL-based $CO_2$-ready power plants, but is not limited thereto.

The CL process involves multi-phase flows and chemical reactions characterized by process nonlinearities and time delays due to mass transport rates and chemical reaction rates. Thus, as will be described in greater detail below, nonlinear optimization and control techniques are beneficial for controlling the CL process. Specifically, an exemplary embodiment includes nonlinear dynamic chemical looping modeling and simulation derived from first principle equations (mass, momentum, and energy balances, for example). The modeling and simulation includes any combination of ordinary differential equations (ODEs), algebraic equations (AEs), and partial differential equations (PDEs). In addition, empirical modeling methods, e.g., neural networks (NN) such as nonlinear autoregressive network with exogenous inputs (NARX), nonlinear auto regressive moving average with exogenous inputs (NARMAX), wavelet network models, and Wiener-Hammerstein models, for example, are used in a hybrid dynamic model structure which combines simplified first-principle models with data-driven models. Further, multivariable model predictive controls (MPC) using both linearized models and nonlinear models provide solutions to dynamic optimization of the CL process. In addition to providing optimized modeling, simulation and control, the multivariable MPC according to an exemplary embodiment is robust to disturbances and model inaccuracy, thereby providing stabilized control of the CL process. MPC can be used as a supervisory controller overseeing the regulatory controls using, for example, PID controllers, fuzzy controllers, or any type of adaptive controllers (self-tuning regulators, neuro-adaptive controllers, wavelet network model reference adaptive controllers). MPC can also be used as direct controllers to regulate and optimize the CL process with multiple interactive loops.

Figure 3:
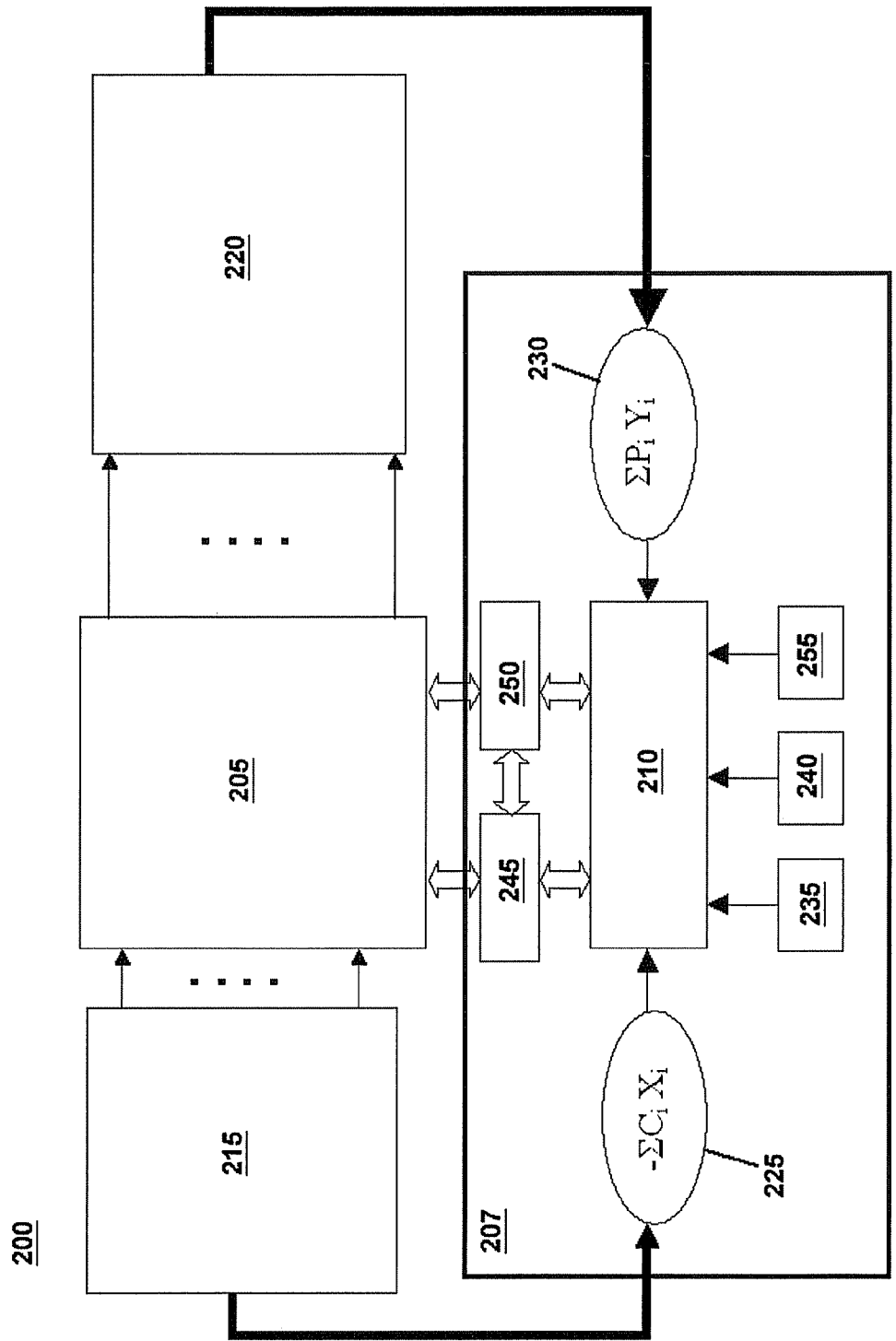
FIG. 3 is a block diagram of an integrated optimization system for a $CO_2$-ready CL system.

Referring to FIG. 3, an optimization system 200 for a CL-based $CO_2$-ready power plant 205 includes a system 207 such as a control system 207, e.g., a plant control system 207, having an optimizer 210. In an exemplary embodiment, the system optimizer 210 is a multivariable optimizer 210 which performs a total economics-based optimization of the power plant 205. More specifically, the multivariable optimizer 210 focuses on thermo-economic performance, emissions reduction and/or control, and life extension criteria for equipment associated with the power plant 205.

To perform the total economics-based optimization of the power plant 205, the multivariable optimizer 210 receives input parameters 215 and output parameters 220 of the power plant 205 through a cost algorithm 225 and an income algorithm 230, respectively, as shown in FIG. 3. In an exemplary embodiment, the input parameters 215 include, but are not limited to, fuel flow, sorbent flow, air flow, water flow, limestone flow, and solids circulation rate. The output parameters 220 include power generation rate, $CO_2$ utilization, $CO_2$ capture, and $CO_2$ storage, for example, but are not limited thereto.

The multivariable optimizer 210 receives outputs from the cost algorithm 225 and the income algorithm 230 to determine an optimized operating parameter solution for the power plant 205, based on predetermined operating constraints 235 and environmental constraints 240, for example. Specifically, in an exemplary embodiment, the cost algorithm 225 sums a set of products of predetermined individual cost factors $C_i$ and individual inputs $X_i$ of the input parameters 215, while the income algorithm 230 sums a set of products of predetermined individual income factors $P_i$ and individual outputs $Y_i$ of the output parameters 220. The individual cost factors $C_i$ include, for example, but are not limited to auxiliary power cost, limestone cost, and fuel cost. The individual income factors $P_i$ include, for example, emissions credit and life extension credit, but are not limited thereto.

The multivariable optimizer 210 applies the optimized operating parameter solution to the power plant 205 using a distributed control system 245 and an advance process control (APC) system 250 as shown in FIG. 3. As a result, the power plant 205 is operated at an optimal total-economics-based operating point.

In an exemplary embodiment, the APC system 250 includes components (not shown) such as a filter, a flash dryer absorber (FDA), a spray dryer absorber (SDA), an electrostatic precipitator (ESP), and/or a flue gas desulfurization (FGD) system, for example, but is not limited thereto.

An exemplary embodiment may further include a soft sensor module 255, as shown in FIG. 3. The soft sensor module 255 includes a soft sensor (not shown), e.g. a virtual sensor which uses software to process signals obtained from the output parameters 220 (or other parameters of the power plant 205). Soft sensors are able to combine and process measured parameters to provide additional parameters, without directly measuring the additional parameters. The soft sensor according to an exemplary embodiment is based on fusion of existing sensors; alternatively, the soft sensor may be based on models developed for simulation and control, for example, but alternative exemplary embodiments are not limited thereto.

In addition, the optimization system 200 according to alternative exemplary embodiments is not limited to utilization with the CL-based-$CO_2$ ready power plant 205 as shown in FIG. 3. For example, the optimization system 200 may be used with any CL-based power plant, such as single or multiple loop CL systems (whether calcium- or metal oxide-based) and CL-based plants with $CO_2$ capture for utilization or sequestration, but alternative exemplary embodiments are not limited thereto.

Figure 4:
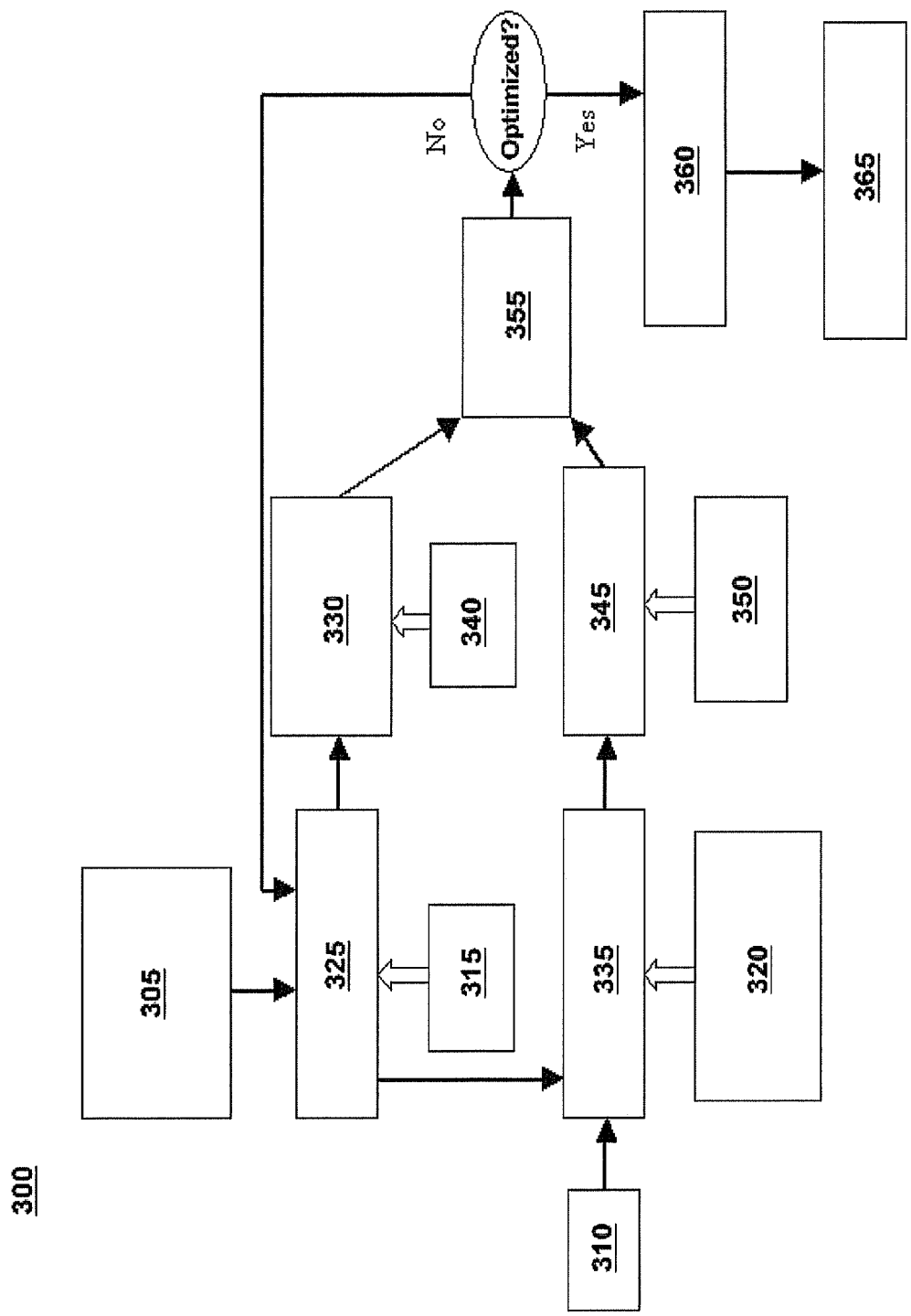
FIG. 4 is a block diagram which illustrates an integrated CL process performance design and controls design optimization.

Referring now to FIG. 4, an optimization process, including performance design and controls design, of an integrated CL plant system according to an exemplary embodiment will be described in further detail. In an exemplary embodiment, the optimization process shown in FIG. 4 is included in the system optimizer 210 (FIG. 3), but implementation of the optimization process shown in FIG. 4 is not limited thereto; instead, the optimization process shown in FIG. 4 may be implemented in any optimizer and, in particular, in any optimizer associated with various CL-based power plants, as described in greater detail above.

In an optimization process 300, e.g., an optimization process 300 for an integrated CL plant system, the optimization process 300 includes performance design optimization and controls system design optimization functions. Specifically, process performance design specifications 305 and control system design specifications 310 are both optimized according to process performance design standards 315 and control system design standards 320, respectively. In an exemplary embodiment, the process performance design specifications 305 include predetermined properties of fuel, properties of sorbent, desired plant capacity, heat rate for a given power generation rate, $CO_2$ quality and quantity, $H_2$ quality, $H_2$ generation efficiency, for example, but are not limited thereto. The control system design specifications 310 include, for example, control system type, response speeds, and tolerance/error margins of operational parameters, but are not limited thereto.

A process performance design module 325 supplies the process performance design specifications 305 and the process performance design standards 315 to a process performance simulation analyzer 330 and a control system design module 335. The process performance simulation analyzer 330 analyzes the process performance design specifications 305 and the process performance design standards 315 based on an output from a process performance simulator 340. At the same time, a dynamics and control simulation analyzer 345 analyzes an output from the control system design module 335 based on an output from a dynamic simulator 350. In an exemplary embodiment, the dynamic simulator 350 is a reduced order modeling (ROM) dynamic simulator 350. Outputs from the process performance simulation analyzer 330 and the dynamics and control simulation analyzer 345 are supplied to a process performance and control evaluator 355 which determines whether the outputs from the process performance simulation analyzer 330 and the dynamics and control simulation analyzer 345 are individually optimized. If the outputs from the process performance simulation analyzer 330 and the dynamics and control simulation analyzer 345 are not individually optimized, the non-optimized outputs from the process performance simulation analyzer 330 and the dynamics and control simulation analyzer 345 are supplied back to the process performance design module 325 for additional analysis, e.g., a subsequent iteration of the abovementioned analysis. If the outputs from the process performance simulation analyzer 330 and the dynamics and control simulation analyzer 345 are optimized, the outputs from the process performance simulation analyzer 330 and the dynamics and control simulation analyzer 345 are combined and sent to an overall system optimizer 360, such as a genetic algorithm (GA) optimizer 360, for example, to output optimized plant performance and operating parameters 365.

As shown in FIG. 4 and described in greater detail above, the optimization process 300 according to an exemplary embodiment uses parallel process performance and control system design analyses. By using both the process performance simulator 340 and the dynamic simulator 350, the optimized plant performance and operating parameters 365 are predicted, evaluated and thereby effectively optimized. The process performance simulator 340 includes, e.g., thermodynamic, thermo-economic, and emission predictions using theoretical and empirical models such as process models and/or regression models in design standards and NN models based on operational databases, for example, but is not limited thereto. The dynamic simulator 350 includes first principle models, or alternatively, combined first principle and data driven empirical models, and/or wavelet network models, as well as control logic simulation modules, for example. For life extending controls (not shown), material models are included, thereby allowing material damage prediction and life extending control simulations (not shown). Similarly, environmental economic models (not shown) may be included in alternative exemplary embodiments, thereby providing analysis of and optimization of emissions such as $SO_2$, $NO_X$, particulates, and $CO_2$, for example.

Since determination of the optimized plant performance and operating parameters 365 may involve multiple iterations to choose among a number of design scenarios, additional optimizers (not shown) may be included such that both process performance and control system design are pre-optimized prior to optimization by the optimizer 360.

Figure 5:
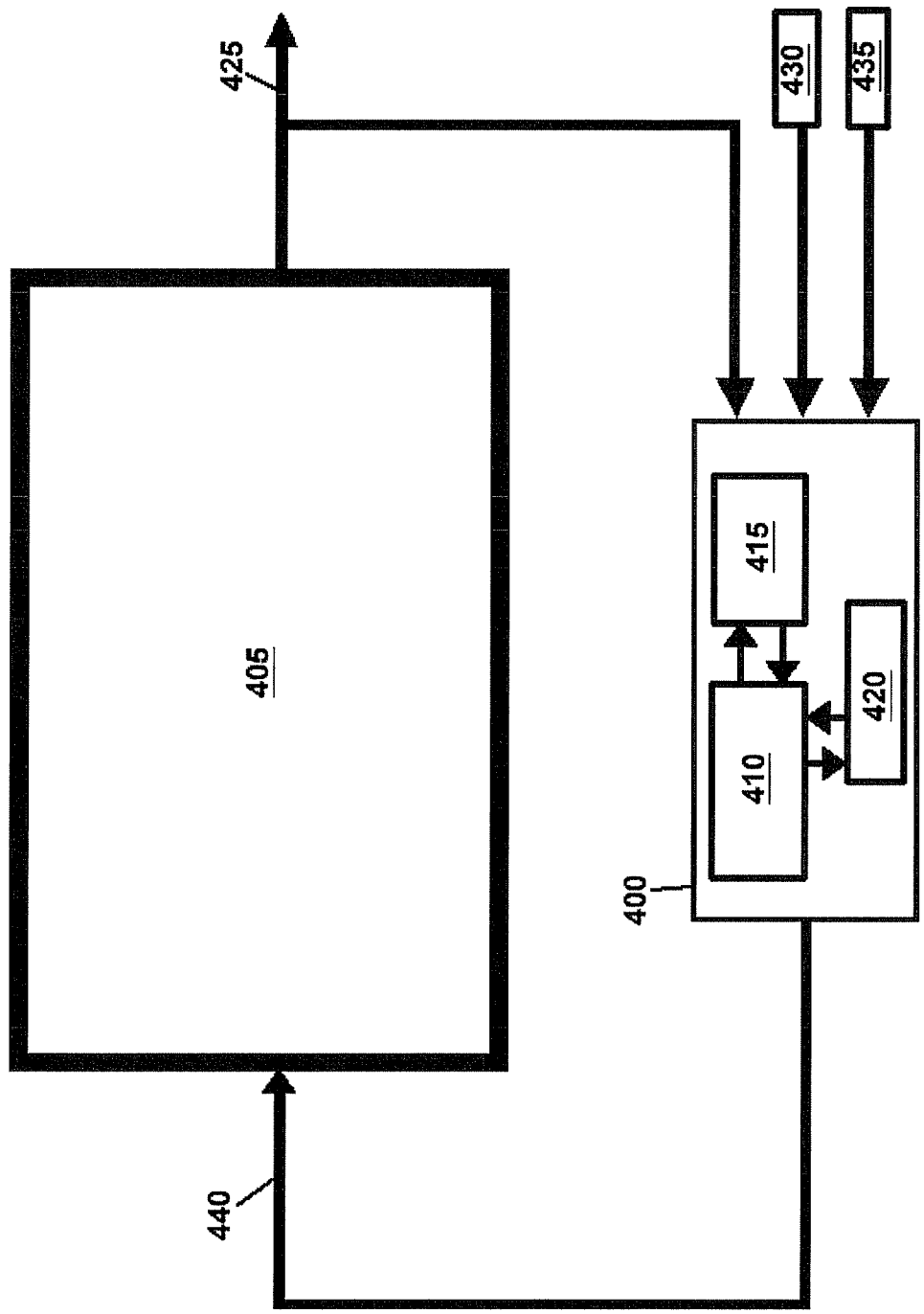
FIG. 5 is a block diagram of a model predictive controls (MPC) controller for a CL process.

Referring now to FIG. 5, an MPC optimal controller according to an exemplary embodiment, and more specifically, an MPC optimal controller for a CL process, will now be described in further detail. In an exemplary embodiment, a controller 400 such as an MPC controller 400 is an advanced optimal control system which uses MPC to control a CL process 405. As described above, the CL process 405 may be used in a single loop or a multiple loop CL system, as well as CL-based plants with $CO_2$ capture for utilization or sequestration and/or CL-based $CO_2$-ready power plants, for example, but is not limited thereto.

As also described above, the CL process involves multi-phase flows and chemical reactions characterized by process nonlinearities and time delays due to mass transport rates and chemical reaction rates. Thus, conventional, e.g., linear, optimization and control are not sufficient for the CL process optimization. Hence, the MPC controller 400 according to an exemplary embodiment includes nonlinear dynamic chemical looping modeling and simulation derived from first principle equations such as mass, momentum, and energy balances, for example. Furthermore, empirical modeling methods such as nonlinear neural networks are used in a hybrid dynamic model structure which combines simplified first-principle models with data-driven models. In particular, the MPC controller 400 includes a model part 410 such as a model 410, a simulator part 415 such as a simulator 415 and an optimizer part 420 such as an optimizer 420.

In an exemplary embodiment, the MPC controller 400 leverages current plant control system components, e.g., existing proportional-integral-derivative (PID) controllers, to supplement and/or replace current plant control systems with model based predictive controls having optimization capabilities. More specifically, the model 410 of the MPC controller 400 according to an exemplary embodiment includes a nonlinear steady state model and one ore more linear or nonlinear dynamic model. In addition, the steady state model and/or the dynamic model may each use adaptive, fuzzy, and/or NN modeling techniques, and/or first principle modeling techniques to model the complex, nonlinear multi-phase flows and chemical reactions of the CL process 405.

Further, in an exemplary embodiment, the model 410 may include a CL system model or, alternatively, CL subsystem and/or CL component models used as a basis for model-based state estimators, parameter estimators, and/or fault detectors. As a result, new soft sensors of the soft sensor control module 255 (FIG. 3) can be derived therefrom and integrated with a control system for optimizing the CL process 405.

In an exemplary embodiment, the simulator 415 is a dynamic simulator 415 which simulates the CL process 405 using advanced techniques. Specifically, the dynamic simulator 415 may be a ROM simulator, e.g., substantially the same as the dynamic simulator 350, described above with reference to FIG. 4, for example, but alternative exemplary embodiments are not limited thereto. Likewise, the optimizer part 420 according to an exemplary embodiment is substantially the same as the optimizer 360 (FIG. 4), but is not limited thereto. For example, in an alternative exemplary embodiment, the optimizer part 420 includes the system optimizer 210 and, more specifically, the multivariable optimizer 210 of the plant control system 207 (FIG. 3).

In operation, the MPC controller 400 receives CL process output parameters 425 from the CL process 405. The CL process output parameters 425 include, but are not limited to, load demand, power, and gas (e.g., $H_2$, $N_2$, $CO_2$ and/or syngas) flow rates. Using set points 430 and predetermined parameters 435, the MPC controller 400 optimizes modeled plant parameters and provides an optimized CL process input control parameter 440 based thereon to the CL process 405. In an exemplary embodiment, the optimized CL process input control parameter 440 is a solids transport inventory control variable, but alternative exemplary embodiments are not limited thereto. For example, the optimized CL process input control parameter 440 may be a reactor temperature control variable, a loop temperature control variable, a bed temperature control variable, a load ramping control variable, a plant start-up control logic algorithm, a reactor pressure variable, a reactor differential pressure variable, a plant shut-down control logic algorithm, and a fuel/air/limestone/steam ratio, but alternative exemplary embodiments are not limited to the foregoing list.

In summary, a process design and control optimization system according to an exemplary embodiment includes a multi-variable, non-linear control optimization system which provides integrated, dynamic and steady state performance and controls design optimization for a chemical looping plant. As a result, plant emissions are substantially reduced and/or effectively minimized while overall economic plant efficiency is substantially improved, resulting in lower overall operating costs.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A chemical looping plant comprising:
    a chemical loop system including an oxidizer and a reducer; the oxidizer being effective to oxidize reduced solids and transport the oxidized solids to the reducer; the reducer being effective to reduce the oxidized solids and transport the reduced solids to the oxidizer; and
    a controller that controls the operation of the chemical looping system, wherein the controller receives input signals indicative of an operational parameter of the chemical loop system and at least one of income generated by the chemical looping system and cost of operating the chemical looping system and, in response to the input signals, provides an output signal to the chemical loop system for controlling and optimizing the operation of the chemical loop system; the controller including:
        a model of at least one of the chemical looping system and a component of the chemical looping system, wherein the model characterizes at least one of the multi-phased flows and chemical reactions of the chemical looping system in response to the inputs signal received from the chemical looping system;
        a simulator configured to simulate the operation of the chemical looping system to predict the operation of the chemical looping system based on the characterization of the chemical looping system by the model; and
        an optimizer operative to provide the output signal optimized for operating the chemical looping system based on the characterization of the chemical looping system by the model and at least one of income generated by the chemical looping system and cost of operating the chemical looping system.

2. The plant of claim 1, wherein the controller comprises a predictive controller.

3. The plant of claim 1, wherein
    the model includes at least one of a steady state model, a dynamic model, an adaptive model, a fuzzy model and a neural network model,
    the simulator includes a reduced order modeling simulator, and
    the optimizer includes at least one of a multivariable optimizer and a genetic algorithm optimizer.

4. The plant of claim 1, wherein the model uses a variable indicative of the operation of the chemical loop system, the variable includes at least one of a solids transport inventory control variable, a reactor temperature control variable, a loop temperature control variable, a bed temperature control variable, a load ramping control variable, a plant start-up control logic algorithm, a reactor pressure variable, a reactor differential pressure variable, a plant shut-down control logic algorithm and a ratio of at least two of a fuel flow, an air flow, a limestone flow and a steam flow, a load demand, a power generation rate, a hydrogen flow rate, a nitrogen flow rate, a carbon dioxide flow rate and a synthesis gas flow rate.

5. The plant of claim 1, wherein the chemical loop system includes one of a single chemical looping system, a multiple chemical looping system, a chemical loop plant with $CO_2$ capture for utilization or sequestration, and a chemical loop $CO_2$-ready plant.

6. The plant of claim 1, further comprising a sensor that provides a sensed signal to the controller that is indicative of an operational parameter of the chemical looping system, wherein the controller determines a different operational parameter of the chemical looping system based on the sensed signal.

7. The plant of claim 1, further comprising a device that controls the operation of the chemical loop system in response to the output signal, wherein the output signal is indicative of at least one of a fuel flow, a sorbent flow, an air flow, a water flow, a limestone flow and a solids circulation rate, a power generation rate, $CO_2$ utilization, $CO_2$ capture, $CO_2$ storage, $H_2$ utilization, $H_2$ capture, $H_2$ storage, synthesis gas utilization, synthesis gas capture and synthesis gas storage.

* * * * *